United States Statutory Invention Registration [19]

[11] Reg. Number: H236

Maykut [43] Published: Mar. 3, 1987

[54] ASYMMETRIC SIDE-EXHAUSTING NOZZLES

[75] Inventor: Albert R. Maykut, Huntsville, Ala.

[73] Assignee: The United States of America as represented by the Secretary of the Army, Washington, D.C.

[21] Appl. No.: 887,141

[22] Filed: Jul. 14, 1986

[51] Int. Cl.[4] ..... F42B 15/033; B63H 11/12

[52] U.S. Cl. ..... 244/3.22; 239/265.11; 239/265.19

*Primary Examiner*—Charles T. Jordan

*Attorney, Agent, or Firm*—John C. Garvin, Jr.; Freddie M. Bush; James T. Deaton

[57] ABSTRACT

Asymmetric side exhausting nozzles are provided for exhausting propulsion gases of a rocket to the side of the rocket to provide a performance gain of from 1 to three percent over axis symmetric side exhausting nozzles.

3 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ASYMMETRIC SIDE-EXHAUSTING NOZZLES

DEDICATORY CLAUSE

The invention described herein may be manufactured, used, and licensed by or for the Government for governmental purposes without the payment to me of any royalties thereon.

BACKGROUND OF THE INVENTION

In the past, missile propulsion systems have used canted nozzles. The need for the canted nozzle arises when there is a requirement to have the missile base area free for guidance and control functions or in cases where forward facing thrust reversing nozzles are required. The most common arrangment of canted nozzles is that of multiple nozzles that are arranged symetrically about the missile axis. There are applications where a single canted nozzle is used. In some applications, such as nozzles exiting through the side of the missile, the nozzle terminates along the line of intersection of the nozzle exit cone and the missile's outer skin. The resulting configuration is called a scarfed nozzle. Exiting the propulsion mass flow to the side of the missile rather than along the axis results in a thrust loss that is proportional to the cosine of the nozzle cant angle. Accordingly, it can be appreciated that there is a need for minimizing propulsion loss in the use of canted nozzles.

Therefore it is an object of this invention to reduce the propulsion lose in canted nozzles by misaligning the flow entering the nozzle relative to the flow through the nozzle.

Another object of this invention is to provide a nozzle which has improved performance in thrust loss.

Other objects and advantages of this invention will be obvious to those skilled in this art.

SUMMARY OF THE INVENTION

In accordance with this invention, an asymmetric side exhausting nozzle is provided in which the throat plane of the exhaust nozzle is canted relative to the exhaust axis through the nozzle to improve the performance of the nozzle relative to the thrust produced.

DESCRIPTION OF THE PREFERRED EMBODIMENT

Figure 1:
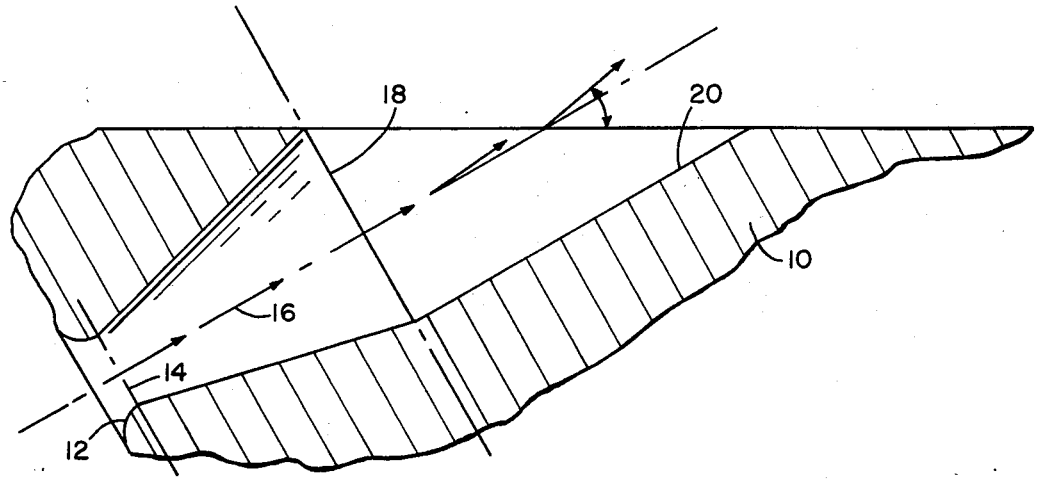
FIG. 1 PRIOR ART
FIG. 1 is a sectional view partially cut-away and illustrating a prior art side exhausting nozzle.

Referring now to the drawings, a prior art nozzle is illustrated in FIG. 1 and includes a throat 12 that has a plane 14 which is perpendicular to an axis 16 of the nozzle and exhaust plane 18 of the nozzle is likewise perpendicular to the axis through the nozzle. In a conventional side exhausting nozzle as illustrated in FIG. 1, the net thrust vector is normal to throat plane 18 at the throat plane and is also aligned with the nozzle exit axis. This alignment of the thrust and nozzle exit axis continues until the scarfed section of the nozzle is reached, where a small turning of the thrust vector occurs. This turning of the thrust vector is caused by the pressure distribution on lower wall 20 which is not balanced because of the absence of an opposite or upper wall in this region.

Figure 2:
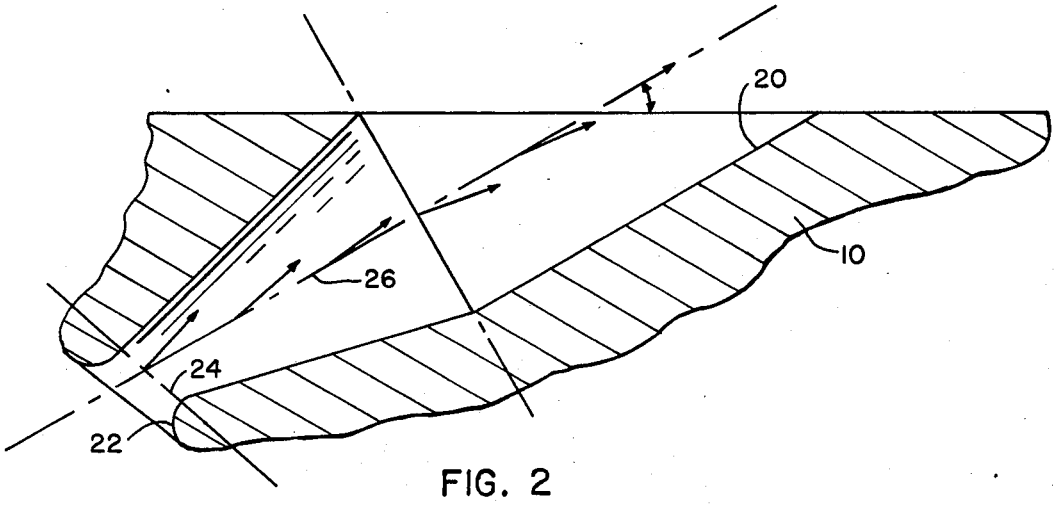
FIG. 2 is a sectional view partially cut-away of an exhaust nozzle in accordance with this invention that has improved performance.

Applicant has discovered that the nozzle performance can be improved as illustrated in FIG. 2, wherein the nozzle throat 22 is skewed so that plane 24 is not normal or perpendicular to exit axis 26 of the nozzle. The thrust vector of throat 22 is normal to the throat plane at the throat, but it is no longer aligned with the nozzle exit axis 26. The direction of the thrust vector through throat 22 is caused to oscillate as the flow procedes down the nozzle. For any given configuration, the degree of throat plane skew can be selected to minimize the thrust vector angle at the nozzle exit plane or at the end of the scarfed extenion for a scarfed nozzle. Proper selection of nozzle parameter such as the throat radius of curvature and nozzle half-angle results in a reduction of the thrust vector angle by some fraction of the throat plane skew angle. Applicant has found that the skew angle for the nozzle can vary from about 2 degrees up to an angle approaching the nozzle half-angle. Since the performance of side exhausting nozzles is proportional to the cosine of the thrust vector angle, performance improvements are significant and in the order of 1 to 3 percent.

I claim:

1. An asymmetric side exhausting nozzle for a rocket in which the exhausting nozzle has a throat with a plane that is skewed relative to a central exhaust axis of the nozzle to cause the thrust vector of the gases exhausting therethrough to oscillate as the flow speeds down the nozzle and causes the gases to be exhausted such as to improve thrust performance of the nozzle.

2. An asymmetric side exhausting nozzle for a rocket as set forth in claim 1, wherein said nozzle throat plane is skewed from about 2 degrees up to an angle approaching the nozzle half-angle.

3. An asymmetric side exhausting nozzle for a rocket as set forth in claim 2, wherein said side exhausting nozzle is a scarfed nozzle.

* * * * *